United States Patent Office 3,461,384
Patented Aug. 12, 1969

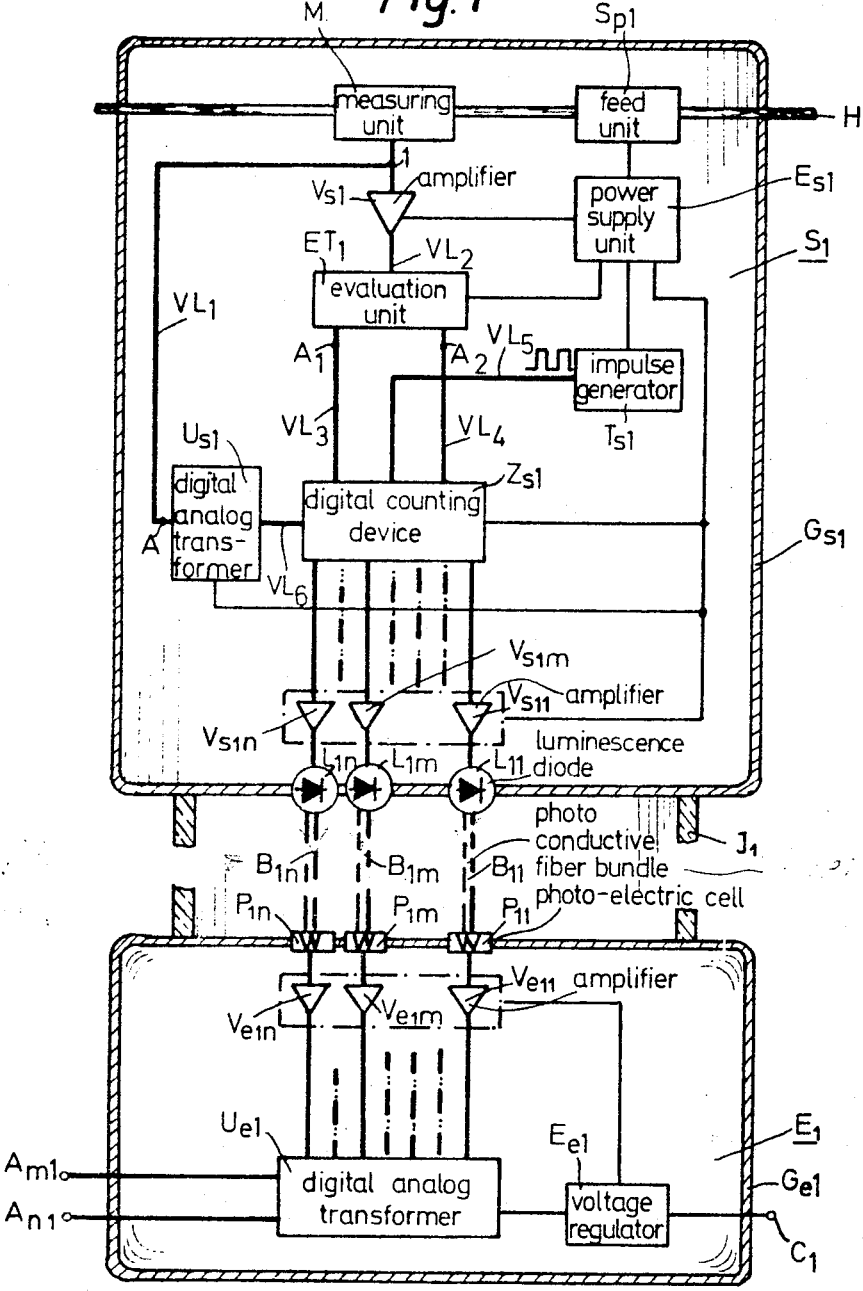

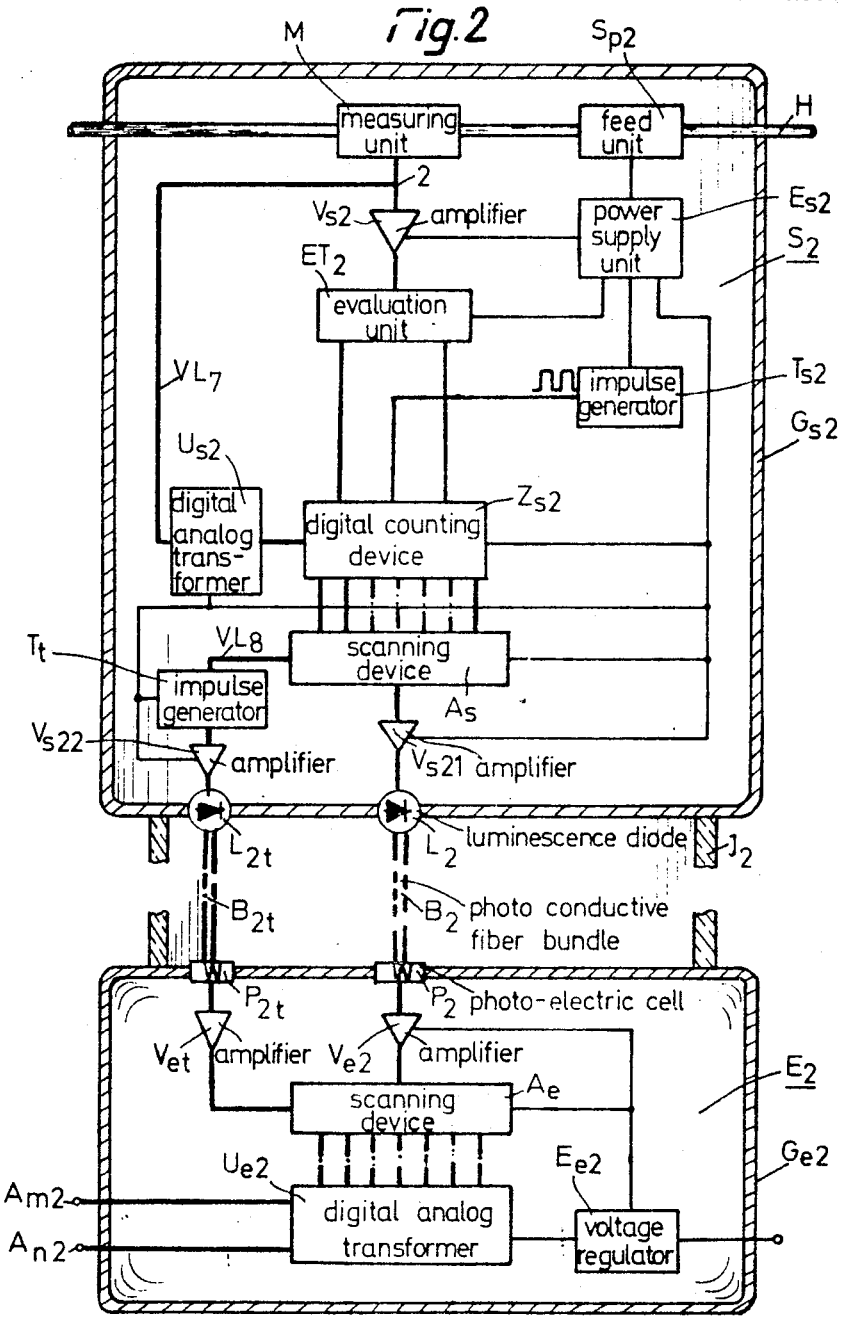

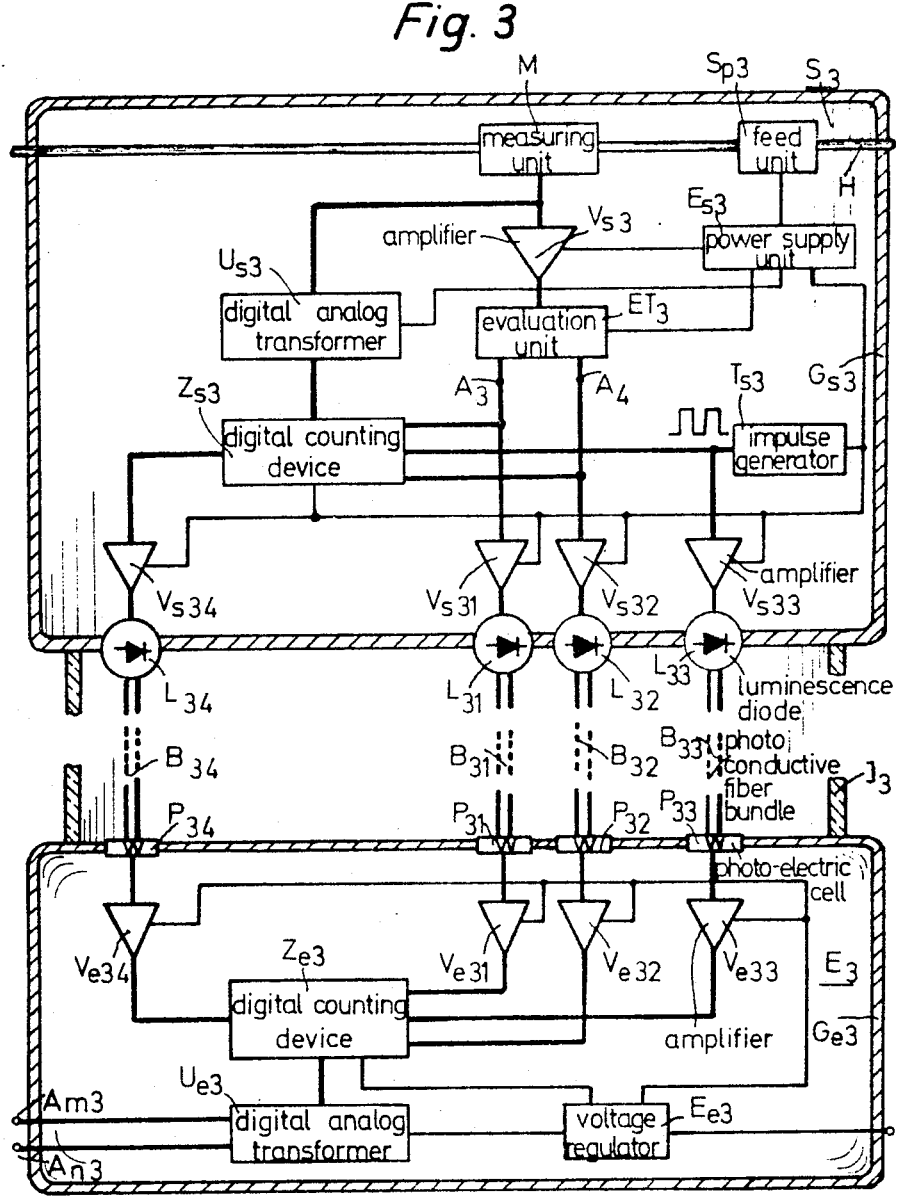

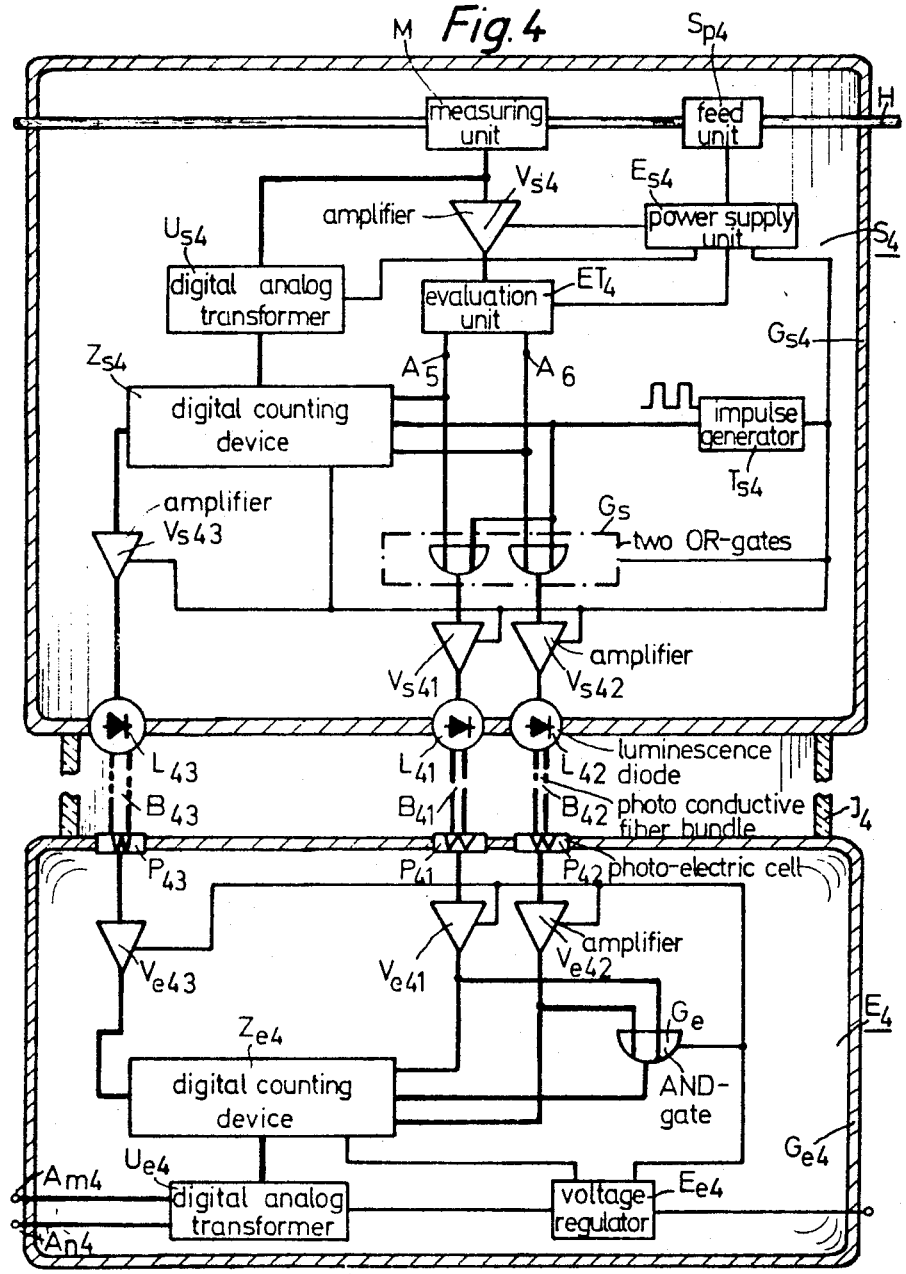

3,461,384
ARRANGEMENT FOR THE TRANSMISSION OF MEASURED VARIABLE PRODUCED BY THE CURRENT FLOWING IN A HIGH-VOLTAGE LINE FROM THE HIGH-VOLTAGE SIDE TO THE LOW-VOLTAGE SIDE
Abutorab Bayati, Karlsruhe-Neureut, and Rudolf Peiser and Lothar Schefter, Berlin, Germany, assignors to Siemens Aktiengesellschaft, a corporation of Germany
Filed Jan. 23, 1967, Ser. No. 611,164
Claims priority, application Germany, Jan. 31, 1966, S 101,730
Int. Cl. G01r 31/00; H04b 9/00; H01j 39/12
U.S. Cl. 324—96                                    10 Claims

ABSTRACT OF THE DISCLOSURE

An arrangement for transmitting a measured variable produced by a current flow in a high-voltage line from a transmitting installation at the high-voltage side, in the form of a digital evaluation, over a light transmission path or paths to a receiving installation at the low-voltage side, at which it is converted to an analog value for measurement and/or protective purposes.

---

The invention relates to an arrangement for the transmission of the measurement of a variable formed by a current flowing in a high-voltage line, or the like, from the high-voltage side to the low voltage side, in which arrangement the measured variable is transmitted to a receiving device disposed on the low-voltage side by means of light rays emitted from transmission means located on the high-voltage side.

In its operation the arrangement corresponds to a current transformer since it is, similar to the customary current transformers, utilizable to transform the high currents into small values suitable for measurements which are accurate as to amount and phase, and in addition thereto to insulate the current carrying conductors connected to high-voltage potential with respect to the measuring system connected to ground potential.

In the case of customary current transformers, the expenditure for the insulation, which in such transformers comprises solid materials, liquid materials or gaseous materials, increases with the voltage to be insulated approximately by the third power so that in the case of current transformers of customary construction which are supposed to be employed in particularly high-voltage systems the economic expenditure and the costs for the insulation are extremely high.

In a known current measuring device, this high expenditure for the insulation is avoided by the feature that light rays are employed for the transmission of the measured values from the high-voltage side to the low-voltage side, in which case the light rays are coded by a rotating perforated disk which possesses holes angularly disposed, according to a certain code, at different degrees. This known arrangement utilizing light rays is disadvantageous insofar as it possesses mass affected movable parts such as a perforated disk, whereby it cannot precisely reproduce rapidly changing current conditions.

Another known current measuring arrangement which does not possess this disadvantage is one in which a voltage proportional to the current in the high-voltage line is transformed into a representative frequency by means of a voltage frequency transformer with a maximum pulse frequency of 125 kHz. and transmitted to the low-voltage side by light rays. At zero current in the high-voltage line, an input voltage with such an amplitude is applied to the transformer that at the output of the transformer impulses with a sequence frequency of 67.5 kHz. occur. A voltage proportional to the measured value, i.e., to the current in the high-voltage line, is superimposed upon this base input voltage so that the sequence frequency increases at the positive semi-period of the current and decreases at the negative semi-period. The frequency fluctuation at the peak value of the rated current amounts to ±2.5 kHz. and at a peak value of 23 times the rate current amounts to ±57.7 kHz., whereby the case of the peak value of the rated current the sequence frequency amounts to 70 kHz. or 65 kHz., respectively, and in the case of the peak value of 23 times the rated current it amounts to 125 kHz. or 10 kHz., respectively.

Through the constant input voltage i.e., through the sequence frequency of 67.5 kHz. at zero current, the known arrangement results in a relatively small phase displacement. However, the small frequency fluctuation results in a relatively large error in the amount. For example, through a temperature error of only 0.5% of the voltage frequency transformer, at 10% of the rated current, following frequency voltage transformation a direct voltage value of approximately 20% is obtained which does not exist at all in the actual measured value, i.e., in the current in the high-voltage line.

Furthermore, when using a voltage frequency transformer with a maximum sequence frequency of 125 kHz., the known arrangement can only detect currents up to 11 times the rated current in the event of unbalanced short circuit currents.

In order to be able, on the one hand, to select the current measuring range arbitrarily large and, on the other hand, to keep the measuring error small, an arrangement is proposed according to the invention which is characterized by the feature that the transmission installation contains an impulse generator the impulses of which influence a digital counting device likewise disposed in the transmission installation in such a manner that its indicator reading corresponds to the respective amplitude of the voltage which occurs in a measuring unit corresponding to the current to be measured, in which the respective indicator reading is transmitted by means of light impulses produced by luminescence or emission diodes to the low-voltage side where it is transformed into an analog value by digital analog transformers.

Expediently, an evaluation unit which renders the impulses of the impulse generator effective in the counting device when a voltage, dependent upon that of the measuring unit being other than zero is disposed ahead of the digital counting device. Preferably, the evaluation unit has two outputs which are connected with the digital counting device. A signal appears at the one output only when the representative voltage at the measuring unit is positive, and at the other output only when such voltage is negative.

On the output side of the digital counter is disposed a digital analog transformer which produces at its output a voltage corresponding to the respective indicator reading. The output voltage of the measuring unit is compared with this voltage, and any difference voltage resulting from the comparison is fed to the determination unit, preferably over an amplifier, as the representative voltage.

In the case of a direct current flowing on the high-voltage side, the amplifier disposed between the measuring unit and the evaluation will be constructed as a direct current amplifier, and in the case of an alternating current flowing on the high-voltage side, it may be constructed as direct current amplifier or alternating current amplifier.

The digital counting device contains an indicator, can run forward and backward and is influenced by the evaluation unit in such a manner that in the case of instantaneous values of the difference current with the one polarity a forward counting takes place, and in the case of instantaneous values of the other polarity a backward counting takes place. The digital counting device is equipped with a number of counting stages determined by the required measuring range and the required accuracy of measurement. The output of such counting stage may induce a luminescence diode respectively connected to it to emit light in accordance with its operating stage, which light is transmited to the low-voltage side, preferably over an optical transmission path comprising photo-conductive fiber bundles.

The transmission of the operating states of the individual counting stages, i.e., of the indicator of the digital counting device can be achieved in various ways. For example, the output of each counting stage can be individually connected, preferably over an amplifier, to a respective emission or luminescence diode the light of which, over respective optical transmission paths, actuates photoelectric cells provided in the receiving installation.

There is also the possibility to connect the outputs of all counting stages of the digital counting device with a scanning device which successively scans the individual counting stages with a frequency which is larger than the sequence frequency of the impulse generator by at least the number of the counting stages, preferably over an amplifier, one single luminescence diode is induced to emit light impulses corresponding to the operating states of the counting stages, which, over an optical transmission path actuate a photo-electric cell in the receiving installation to deliver corresponding electrical impulses. In the receiving installation, a further scanning device, running in synchronism with the scanning device of the transmission installation, is connected preferably over an amplifier to the photo-electric cell, the further scanning device reproducing by means of the electrical impulses produced by the photo-electrical cell, the indicator condition at the input of the digital analog transformer.

Expediently, in an arrangement according to the invention provided with scanning devices, a further impulse generator is provided, either in the transmitting installation or in the receiving installation, the impulses of which insure the synchronous operation of the two scanning devices. In this case, one of the scanning devices could be connected directly with such further impulse generator and the other scanning device can be connected with such generator by means of a transmission channel comprising a luminescence diode, fiber bundles and photo-electric cell.

The arrangement according to the invention can also be constructed in such a manner that in addition to the digital counting device in the transmitting installation, a further digital counting device is provided in the receiving installation, connected to ground potential, which counting device is to indicate the same indicator position as the counting device in the transmitting installation. For this purpose the outputs of the evaluaton unit and of the impulse generator are connected advantageously, not only with the digital counting device in the transmission installation, but also with the further counting device in the receiving installation over transmission channels respectively comprising a luminescence diode, fiber bundles and a photo-electric cell. In this case the outputs of the evaluation unit and of the impulse generator can be connected with the further counting device over respective individual transmission channels.

It is possible, however, and, because of the saving of a transmission channel, also advantageous, to transmit the impulses of the impulse generator over the existing channels between the outputs of the evaluation unit and the further counting device by mixing the impulses of the impulse generator in two OR-gates disposed in the transmission installation with the output signals of the evaluation unit and subsequently separating them from such output signals by means of an AND-gate disposed in the receiving installation. Consequently, in this embodiment, the transmission channels connected with the outputs of the evaluation unit are simultaneously employed for the transmission of the impulses of the impulse generator. A saving of the transmission channel is thereby achieved. In addition to the transmission channels above described, expediently an additional transmission channel can be provided in the arrangement according to the invention with two digital counting devices, over which additional channel at zero indication of the indicator of the digital counting device, the indicator of the further digital counting device is checked and, if necessary, cleared (set to zero).

Digital analog transformers can be connected to the digital counting device disposed in the receiving installation, which correspond to the transformer provided in the transmission installation, in structure. Advantageously, the digital analog transformers are provided with two outputs, one of which can serve for measuring purposes and the other one for main protection purposes.

In order to reduce the expenditure in the electronic structural components, the frequency of the impulse generator and therewith the operating speed of all succeeding electronic structural components can be advantageously reduced by the feature that instead of a linear quantization in which every timing impulse acting, in accordance with the evaluation unit, upon the first stage of the counting device, changes the indicator position only by the digital value 1, by appropriate design of the counting device the impulses of the impulse generator may act upon several counting stages so that through every impulse the indicator position is changed by a digital value 1 or larger than 1. Expediently, this non-linear quantization takes place dependent upon the instantaneous value or the temporal change of the current in the high voltage line.

In the case of an alternating current flowing on the high-voltage side, the measuring unit can, for example, comprise a current transformer with low-voltage insulation, the iron core of which is closed or provided with air gaps. In the case of a direct current flowing on the high-voltage side, the measuring unit can, for example, contain an ohmic resistance, a Hall generator or a magnetically controllable resistance.

The current supply of the transmission installation can advantageously be achieved by means of a saturation current transformer disposed at the high-voltage line which transformer enters into saturation at a relatively small current in the high-voltage line and delivers a voltage, the rectified value of which is constant.

The receiving installation at ground potential can be expediently supplied with operating current through an external voltage source over a voltage regulator.

The arrangement according to the invention can be advantageously accommodated in the case of a measuring transformer consisting of a headpiece, insulator and base piece, the headpiece containing the transmission installation and the base piece containing the receiving installation.

In the drawings, in which corresponding reference symbols indicate like or corresponding parts:

FIGS. 1 and 2 illustrate schematic circuits of arrangements embodying the invention, in which the indicator position of a digital counting device in the transmission installation is transmitted to the receiving installation at the low-voltage side; and FIGS. 3 and 4 illustrate similar schematic circuits of arrangements in which both the transmission and receiving installations are provided with counting devices.

Referring to FIG. 1, disposed in the case $G_{s1}$ and connected to high-voltage potential, is a transmission installation $S_1$, which contains the measuring unit M disposed directly at the high-voltage line H traversed by the current to be measured. The measuring unit M produces a voltage at its output which is proportional to the current in the high-voltage line H. After a comparison with a voltage delivered to the circuit point 1 by means of the connection line $VL_1$, the resulting voltage is conducted to the amplifier $V_{s1}$, which is connected, over the connection line $VL_2$, with the evaluation unit $ET_1$, the construction of which is well known. The evaluation unit $ET_1$ produces a signal which corresponds to the respective instantaneous value of the difference current of one polarity at its output $A_1$ and $A_2$. This signal is connected with the digital counting device $Z_{s1}$ over connection lines $VL_3$ and $VL_4$. The impulse generator $T_{s1}$ is likewise connected with the digital counting device $Z_{s1}$ over a connection line $VL_5$. According to whether a signal is present at the output $A_1$ or at the output $A_2$ of the evaluation unit $ET_1$, the digital counting device $Z_{s1}$ counts the impulses of the impulse generator $T_{s1}$, for example, constructed as a stable sweep stage forward or backward and always indicates an indicator which corresponds in digital form to the instantaneous value of the current in the high-voltage line H. The digital analog transformer $U_{s1}$ is connected over the connection line $VL_6$ to the digital counting device $Z_{s1}$, which transformer produces at its output A a voltage which reproduces in an analog form the indicator position of the counting device $Z_{s1}$. As previously mentioned, this voltage is compared at the circuit point 1 with the voltage supplied by the measuring unit M. Through this regulation, the indication position of the digital counting device $Z_{s1}$, always follows the instantaneous value of the current flowing in the high-voltage line H.

The outputs of the individual counting stages of the counting device $Z_{s1}$ are connected, preferably over amplifiers $V_{s11}$, $V_{s1m}$, $V_{s1n}$, etc. with emission or luminescence diodes $L_{11} \ldots L_{1m} \ldots L_{1n}$. Corresponding to the operating states of the counting stages, the luminescence diodes $L_{11}$ to $L_{1n}$ deliver light which is transmitted to photo-electric cells $P_{11} \ldots P_{1m} \ldots P_{1n}$, disposed in the receiving installation, over photo conductive fiber bundles $B_{11} \ldots B_{1m} \ldots B_{1n}$ preferably located within the insulator $J_1$.

The photo-electric cells $P_{11}$ to $P_{1n}$ are located in the case $G_{e1}$ which contains the entire receiving installation $E_1$. Connected to the photo-electric cells $P_{11}$ to $P_{1n}$, are amplifiers $V_{e11} \ldots V_{e1m} \ldots V_{e1n}$ which conduct the electrical impulses produced by the photo-electric cells $P_{11}$ to $P_{1n}$, in amplified form, to the digital analog transformer $U_{e1}$ which preferably has two outputs, the output $A_{m1}$ serving for measuring purposes and the output $A_{n1}$ serving for main protection purposes.

In order to supply the transmission installation $S_1$ with operating voltage, a feed unit $S_{p1}$ is provided directly at the high-voltage line H which unit may comprise, for example, a saturation current transformer. The feed unit $S_{p1}$ delivers a voltage to the power supply unit $E_{s1}$ which provides the amplifier $V_{s1}$ and the evaluation unit $ET_1$, as well as the impulse generator $T_{s1}$, the digital counting device $Z_{s1}$, the digital analog transformer $U_{s1}$ and the amplifiers $V_{s11}$ to $V_{s1n}$ with operating current.

The receiving installation $E_1$ is provided with operating current over a voltage regulator $E_{e1}$ from an external voltage source, not shown in the figure, which is connected to the input $C_1$.

The operation of this arrangement according to the invention is as follows:

If a current flows through the high-voltage line H, the measuring unit M forms at its output a voltage which is proportional to the current. This voltage is compared with a voltage given out by the digital analog transformer $U_{s1}$ and the difference voltage resulting from the comparison, following amplification in the amplifier $V_{s1}$, is conducted to the evaluation unit $ET_1$.

If the instantaneous value of the difference voltage is positive, the evaluation unit $ET_1$ produces, for example at its output $A_1$, a signal by means of which signal the digital counting device $Z_{s1}$ is so influenced that it counts the impulses received from the impulse generator $T_{s1}$ in a forward direction (addition).

Corresponding to the respective indicator position of the digital counting installation $Z_{s1}$, the digital analog transformer $U_{s1}$, connected to the counting installation $Z_{s1}$ by means of the connection line $VL_6$, produces an analog voltage which is conducted to the circuit point 1 over the connection line $VL_1$ and there compared with the voltage at the output of the measuring unit M. If the voltages of the measuring unit M and of the digital analog transformer $U_{s1}$ are equal, the differential voltage at the input of the amplifier $V_{s1}$ and therewith also at the input of the evaluation unit $ET_1$ is zero. As a result, no signal appears either at the output $A_1$ or at the output $A_2$ of the evaluation unit $ET_1$ whereby the impulses of the impulse generator $T_{s1}$ do not become effective in the digital counting device $Z_{s1}$. In this case the digital counting device $Z_{s1}$ does not change its indicator position.

If the instantaneous value of the differential voltage is negative, a signal then appears at the output $A_2$ of the evaluation unit $ET_1$. This signal so controls the digital counting device $Z_{s1}$ that the impulses of the impulse generator $T_{s1}$ are counted backward (subtraction).

For the reproduction of the respective indicator position of the digital counting device $Z_{s1}$ in the receiving installation $E_1$, the luminescence diodes $L_{11}$ to $L_{1n}$ are excited to give out light rays via amplifiers $V_{s11}$ to $V_{s1n}$ provided at the output of the counting stages of the digital counting device $Z_{s1}$, which light rays are led to photoelectric cells $P_{11}$ to $P_{1n}$ over fiber bundles $B_{11}$ to $B_{1n}$. Through the electrical impulses produced by the photo-electric cells, corresponding to the light rays striking them, which impulses are amplified in the amplifiers $V_{e11}$ to $V_{e1n}$, the indicator position of the digital counting device $Z_{s1}$ is reproduced at the inputs of the digital analog transformer $U_{e1}$.

If only one digital analog transformer is provided in the receiving installation $E_1$, this transformer is expediently equipped with two outputs. From these outputs can be conducted, for example, as an input signal, a measured value, in analog form, proporional to the current in the high-voltage line H to a measuring installation over the output $A_{m1}$ and a further value in analog form to a main protection installation over the output $A_{n1}$.

If there are several digital analog transformers present in the receiving installation $E_1$, then, for example, one of the transformers may have only an output for the measuring installation and the other transformer only an output for the actuation of the main protection instruments.

A further constructional example of the arrangement according to the invention is illustrated in FIG. 2. Corresponding to the embodiment illustrated in FIG. 1, this arrangement likewise contains a measuring unit M in the transmission installation $S_2$ disposed in the case $G_{s2}$, which measuring unit is arranged at the high-voltage line H, an amplifier $V_{s2}$ connected therewith and an evaluation unit $ET_2$. This evaluation unit influences the digital counting device $Z_{s2}$ in the same manner as described in connection with FIG. 1, i.e., at instantaneous values of the difference voltage with the one polarity lying at the input of the amplifier $V_{s2}$, the impulses of the impulse generator $T_{s2}$ are counted in forward manner, and at instantaneous values of the other polarity they are counted in backward manner. The digital analog transformer connected to the digital counting device $Z_{s2}$ supplies the voltage required for the formation of the difference voltage over the connection line $VL_7$ to the circuit point 2.

In order to reduce the number of relatively expensive transmission channels of the example shown in FIG. 1, in the arrangement according to FIG. 2, a scanning device $A_s$ is connected to the output side of the digital counting device $Z_{s2}$, which scanning device scans the individual counting stages of the digital counting device $Z_{s2}$ one after another with a frequency which is larger by at least the number of the counting stages than the sequence frequency of the impulse generator $T_{s2}$. To the single output of the scanning installation $A_s$ a single luminescence diode $L_2$ is connected, preferably over an amplifier $V_{s21}$.

The luminescence diode $L_2$ is excited by the scanning device $A_s$ in correspondence to the operating states of the counting stages of the digital counting device $Z_{s2}$ to emit light impulses which are transmitted to the low-voltage side by means of the fiber bundle $B_2$ extending in the insulator $J_2$, which actuate a photo-electric cell $P_2$, disposed in the case $G_{s2}$ of the receiving installation $E_2$, to supply electrical impulses.

The electrical impulses are conducted preferably after amplification in the amplifier $V_{e2}$, to a further scanning device $A_e$ which reproduces the indicator position of the digital counting installation $Z_{s2}$ at the input of the digital analog transformer $U_{e2}$ by means of the electrical impulses. As previously described, the digital analog transformer $U_{e2}$ supplies at its outputs $A_{m2}$ and $A_{n2}$ electrical values in analog form for measuring installations and main protection devices.

In the embodiment of the invention, it is important that the two scanning devices $A_s$ and $A_e$ operate synchronously. In order to achieve this, an additional impulse generator $T_t$ is provided, preferably in the transmission installation $S_2$, which controls the scanning installation $A_2$ over the connection line $VL_8$. The further scanning device $A_2$ located in the receiving installation $E_2$ is controlled synchronously with the scanning device $A_s$ by the impulses of the additional impulse generator $T_t$ over a transmission channel consisting of the amplifier $V_{s22}$, the luminescence diode $L_{2t}$, the fiber bundle $B_{2t}$, the photo-electric cell $P_{2t}$ and the amplifier $V_{et}$.

The power supply for the transmission installation $S_2$ as well as of the receiving installation $E_2$ can be accomplished in the same manner as in the embodiment of FIG. 1. Thus, a feed unit $S_{p2}$ is again provided at the high-voltage line H, which unit may, for example, comprise a saturation current transformer. The feed unit $S_{p2}$ provides the power supply unit $E_{s2}$ with power, from which the individual components of the transmission installation $S_2$, such as amplifier $V_{s2}$, evaluation unit $ET_2$, impulse generator $T_{s2}$, etc., are provided with operating current.

The energy supply of the receiving installation $E_2$ is derived from an external voltage source over a voltage regulator $E_{e2}$.

A further constructional example of an arrangement according to the invention, which likewise utilizes merely several transmission channels is illustrated in FIG. 3. In the transmission installation $S_3$ which is accommodated in the case $G_{s3}$, the digital counting device $Z_{s3}$, in the manner already described assumes an indicator position which represents in digital form the value of the current in the high-voltage line H by means of the measuring unit M, the amplifier $V_{s3}$, the evaluation unit $ET_3$ and the digital analog transformer $U_{s3}$ with the cooperable impulse generator $T_{s3}$.

In deviation from the previously described embodiments of the invention, in the present example the two outputs $A_3$ and $A_4$ of the evaluation unit $ET_3$ are connected not only with the entrance of the digital counting installation $Z_{s3}$, but over respective transmission channels also with the receiving installation $E_3$. Each of these two transmission channels comprises an amplifier $V_{s31}$ or $V_{s32}$, a luminescence diode $L_{31}$ or $L_{32}$, the fiber bundle $B_{31}$ or $B_{32}$, the photo-electric cell $P_{31}$ or $P_{32}$ and the amplifier $V_{e31}$ or $V_{e32}$. Signals appearing at the output $A_3$ or $A_4$ of the evaluation unit $ET_3$ are transmitted over these channels to the low-voltage side and there utilized for the control of a further counting device $Z_{e3}$ disposed in the receiving installation $E_3$.

In similar manner, the output of impulse generator $T_{s3}$ is connected not only with the digital counting installation $Z_{s3}$ in the transmission installation $S_3$, but also with the further counting installation $Z_{e3}$ over a further transmission channel comprising the amplifier $V_{s33}$, the luminescence diode $L_{33}$, the fiber bundle $B_{33}$ located within the insulator $J_3$, the photo-electric cell $P_{33}$ and the amplifier $V_{e33}$. In this embodiment of the invention the impulses of the impulse generator $T_{s3}$ consequently are counted not only in the digital counting device $Z_{s3}$ disposed in the transmission installation $S_3$, but also in the further digital counting device $Z_{e3}$ located on the low-voltage side.

A digital analog transformer $U_{e3}$ is connected to the additional digital counting device $Z_{e3}$ and disposed in the case $G_{e3}$ of the receiving installation $E_3$. Advantageously, this transformer is provided with two inputs. Over the output $A_{m3}$ a measuring installation may be fed and over the output $A_{n3}$ main protection devices may be fed with an analog electrical value which is proportional to the current in the high-voltage line H.

In order to be able to check the conformity of the indicator positions of the counting devices $Z_{s3}$ and $Z_{e3}$ in the transmission installation $S_3$ and in the receiving installation $E_3$, a further transmission channel may be provided which comprises the amplifier $V_{s34}$, the luminescence diode $L_{34}$, the fiber bundle $B_{34}$, the photo-electric cell $P_{34}$ and the amplifier $V_{e34}$. The output of the digital counting device $Z_{s3}$ is connected over this transmission channel with the additional digital counting device $Z_{e3}$. Expediently, at the zero passage of the indicator position of the digital counting device $Z_{s3}$, the indicator positions are compared with one another over this transmission channel. If the indicator position of the further digital counting device $Z_{e3}$ deviates from that of the counting installation $Z_{s3}$, the indicator position of the further counting installation $Z_{e3}$ can be accordingly reset.

The power supply of the transmission installation $S_3$ is assured in the previously described manner by the power supply unit $E_{s3}$ fed by the feed unit $S_{p3}$. An external voltage source which is connected to the receiving installation $E_3$ over a voltage regulator $E_{e3}$ serves for the power supply of the receiving installation $E_3$.

In order to further save one additional transmission channel in comparison with the embodiment of the invention just described, an arrangement such as illustrated in FIG. 4 may be utilized. In this embodiment, a digital counting device likewise is provided in the transmission installation $S_4$ accommodated in the case $G_{s4}$ and also in the receiving installation $E_4$ disposed in the case $G_{e4}$.

In the counting device $Z_{s4}$, an indicator position is produced in the manner already described by means of the measuring unit M disposed at the high-voltage line H, the amplifier $V_{s4}$, the evaluation unit $ET_4$, the digital analog transformer $U_{s4}$ and the impulse generator $T_{s4}$, with the indicator position corresponding to the value of the current in the high-voltage line H. In order to also have this indicator position available in the receiving installation $E_4$, the outputs $A_5$ and $A_6$ of the evaluation unit $ET_4$, as well as the output of the impulse generator $T_{s4}$ are also connected with the further digital counting installation $Z_{e4}$ provided in the receiving installation $E_4$ over only two transmission channels, which transmission channels comprise the amplifier $V_{s41}$ or $V_{s42}$, the luminescence diode $L_{41}$ or $L_{42}$, the fiber bundle $B_{41}$ or $B_{42}$ located in the insulator $J_4$, the photo-electric cell $P_{41}$ or $P_{42}$ and the amplifiers $V_{e41}$ or $V_{e42}$.

In order to be able to conduct the output signals of the evaluation unit $ET_4$ as well as the impulses of the impulse generator $T_{s4}$ over these two transmission channels of the further digital counting installation $Z_{e4}$, two OR-gates $G_s$ are provided in the transmission installation $S_4$, in which OR-gates the output signals of the evaluation unit $ET_4$ are mixed with the impulses of the impulse generator $T_{s4}$. By means of the AND-gate $G_e$ provided in the receiving installation $E_4$, the impulses are again separated from the output signals of the evaluation unit $ET_4$.

To permit the checking of the indicator position of the digital counting device $Z_{e4}$, a further transmission channel is also provided in this embodiment which contains the amplifier $V_{s43}$, the luminescence diode $L_{43}$, the fiber bundle $B_{43}$, the photo-electric cell $P_{43}$ and the amplifier $V_{e43}$. The digital counting device $Z_{s4}$ is connected over this transmission channel with the additional digital counting device $Z_{e4}$ which is checked for its indicator position at the zero passage of the indicator position of the digital counting device $Z_{s4}$.

The indicator position of the additional digital counting device $Z_{e4}$ is transformed into an analog value by means of a digital analog transformer $U_{e4}$ connected to such counting device. This analog value can be conducted, for example, to a measuring device over the output $A_{m4}$ and to a main protection installation over the exit $A_{n4}$.

The power supply of the transmission installation $S_4$ is effected through the feed unit $S_{p4}$ in connection with the power supply unit $E_{s4}$, while the receiving installation $E_4$ is provided with operating current through an external voltage source over the voltage regulator $E_{e4}$.

It will be appreciated from the above description that through the invention a current measuring arrangement is achieved, the current measuring range of which can be selected arbitrarily large and is not, as in the case of the known current measuring arrangement employing a voltage frequency transformer, limited by a maximum sequence frequency of the voltage frequency transformer. In addition to this, the arrangement according to the invention distinguishes itself by a relatively high measuring accuracy since measurement errors are dependent only upon one single constructional component, i.e., the digital analog transformer. Consequently, the measurement error can be kept relatively small.

A further advantgae of the arrangement according to the invention can be seen in the fact that the measured value is present at the low-voltage side in digital form, whereby a digital processing for measurement, counting and protection purposes may be utilized.

We claim:

1. An arrangement for the transmission of a measured variable formed by a current flowing on the high-voltage side from such high-voltage side to the low-voltage side, in which the measured variable is transmitted to a receiving installation disposed at the low-voltage side by means of light rays emitted by a transmission installation disposed at the high-voltage side, comprising a measuring unit disposed at the high-voltage side operatively connected to the curernt source to be measured, a digital counting device, an impulse generator operatively connected to said counting device for providing actuating impulses therefor, means operatively connecting said measuring unit and said counting device for controlling the operation of the latter by said impulses in correspondence to the current to be measured, whereby the indicator position of said counting device correspondings to the current to be measured, means including luminescence diodes, and light responsive elements forming light transmission channels operatively connecting the transmission and receiving installations for transmitting, by means of light impulses, signals representative of the respective indicator position, from the transmission to the receiving intallation and reproducing the same at said low-voltage side, and digital analog transformer means disposed at the low-voltage side operatively connected to said light transmission channels for transforming the received signals into an analog value corresponding to the digital value of said indicator position.

2. An arrangement according to claim 1, wherein said connecting means between the measuring unit and the counting device comprises an evaluation unit, the output of which is dependent upon the polarity of the input voltage thereto, whereby the counting device is controlled as to its forward or backward direction in accordance with said output polarity.

3. An arrangement according to claim 2, comprising a digital analog transformer operatively connected to said digital counting device, the latter having a number of counting stages as determined by the required measuring range and the required accuracy of measurement, said digital analog transformer being operative to produce at its output a voltage corresponding to the indicator position of said counting device, means for feeding to the evaluation unit as input voltage representing the current measurement the difference voltage resulting from a comparison between the output voltages of said measuring unit and said transformer, said evaluation unit having two outputs connected to said counting device, one of which is responsive to a difference voltage of one polarity and the other responsive to a difference voltage of opposite polarity.

4. An arrangement according to claim 3, wherein said each counting stage of said counting device is operatively connected to a respective luminescence diode whereby the latter is operative to emit light in correspondence to the operating state of the particular stage, a light responsive element being provided, for each diode, at the receiving installation, a photoconductive fiber bundle for each cooperable pair of luminescence diode and light-responsive element forming the optical transmission means therebetween, the digital analog transformer means connected to said light-responsive elements having output means for connection to responsive devices such as measuring devices and main-protection devices.

5. An arrangement according to claim 3, comprising in further combination, a scanning device operatively connected to the outputs of the respective counting stages of said counting device, operative to scan such outputs at a frequency which is larger than the sequence frequency of said impulse generator by at least the number of the counting stages of said counting device, a cooperable scanning device, operating synchronously with said first mentioned scanning device, disposed at the receiving installation, said scanning devices being operably connected by a single light transmission channel, said digital analog transformer at the receiving installation being operatively connected with said light transmission channel by said second mentioned scanning device, and operative to transform the reprodduced indicator position at the output of said scanning device into a corresponding analog value.

6. An arrangement according to claim 5, wherein synchronism between said scanning devices is controlled by a further impulse generator, said generator being operatively connected directly with one of said scanning devices and operatively connected to the other scanning device over a cooperable light transmission channel.

7. An arrangement according to claim 3, comprising in further combination, a further digital counting device, located at the receiving installation, operatively disposed between the digital analog transformer thereat and the light responsive elements of said light transmission channels, the outputs of said evaluating unit and the impulse generator controlling the first mentioned digital counting device being operatively connected to said second mentioned digital counting device by respective light transmission channels, whereby said second mentioned digital counting device is actuated in synchronism with said first mentioned digital counting device.

8. An arrangement according to claim 7, comprising a further light transmission channel operatively connecting said transmission and receiving installations, the luminescence diode of which is operatively connected to said first mentioned digital counting device, and the light responsive element of which is operatively connected with said second mentioned digital counting device, by means of which the position of the latter may be checked.

9. An arrangement according to claim 7, wherein two light transmission channels are employed for the transmission of the outputs of said evaluation unit and the impulse generator, comprising means operatively connecting each output of the evaluation unit to a respective one of such light transmission lines, said coupling means operatively connecting the output of said impulse generator to both light transmission lines, and means operatively connected to the light responsive elements of said light transmission lines for separating the transmitted generator impulses from the output signals of the evaluation unit, the output of such last mentioned means being connected to said second mentioned counting device.

10. An arrangement according to claim 9, wherein said coupling means comprises respective OR-gates, each connecting the output of the impulse generator and one of the outputs of the evaluation unit with a respective transmission line, said means at the receiving installation for separating out the generator impulses comprising an AND-gate with which each of said transmission channels are operatively connected, the output of said AND-gate being conducted to the second mentioned digital counting device for supplying such generator impulses thereto.

References Cited

UNITED STATES PATENTS

| | | | |
|---|---|---|---|
| 3,324,393 | 6/1967 | Casey et al. | 324—96 |
| 3,346,811 | 10/1967 | Perry et al. | 324—96 |

RUDOLPH V. ROLINEC, Primary Examiner

C. F. ROBERTS, Assistant Examiner

U.S. Cl. X.R.

88—14; 250—199, 225; 340—190